C. N. TEETOR.
ENGINE.
APPLICATION FILED OCT. 22, 1921.
1,414,796. Patented May 2, 1922.
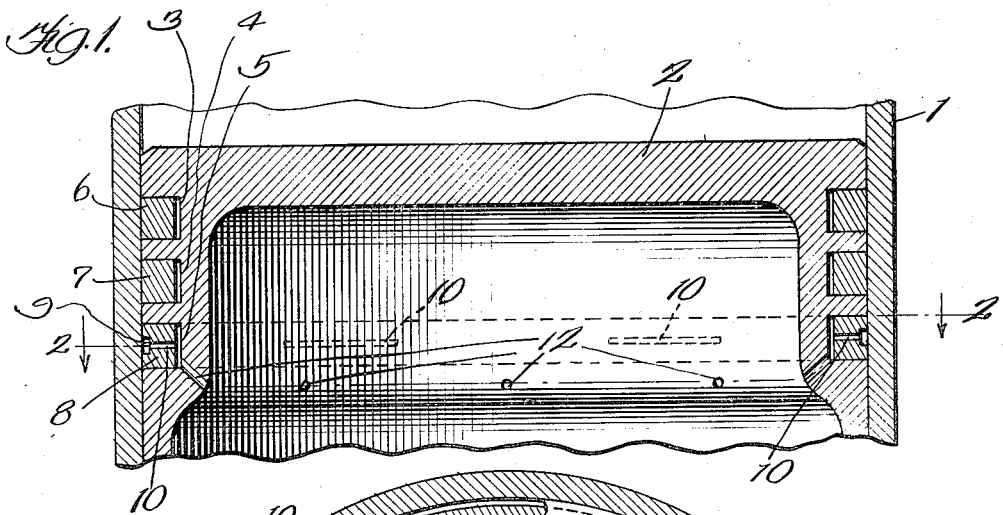
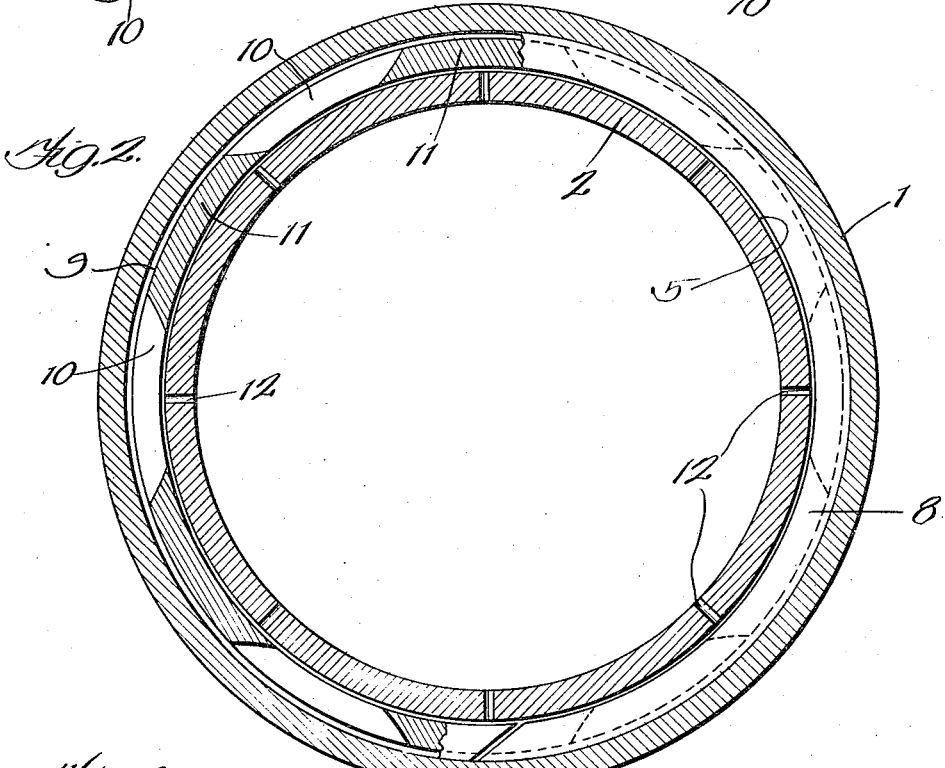
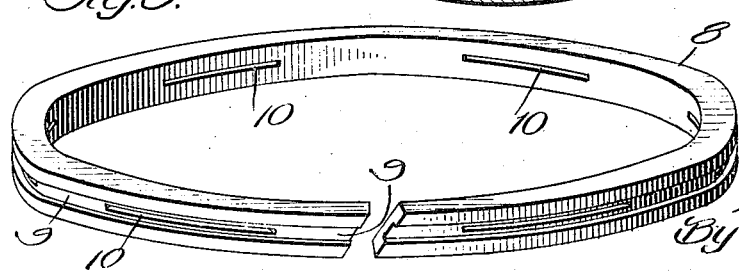
Inventor:
Charles N. Teetor.
By G. A. Bragg
Atty.

UNITED STATES PATENT OFFICE.

CHARLES N. TEETOR, OF HAGERSTOWN, INDIANA.

ENGINE.

1,414,796.    Specification of Letters Patent.    Patented May 2, 1922.

Application filed October 22, 1921. Serial No. 509,636.

*To all whom it may concern:*

Be it known that I, CHARLES N. TEETOR, a citizen of the United States, residing at Hagerstown, in the county of Wayne and State of Indiana, have invented a certain new and useful Improvement in Engines, of which the following is a full, clear, concise, and exact description.

My invention relates to engines and resides in the construction of the pistons and piston rings thereof, the piston rings of the present invention being an improvement upon the piston ring disclosed in the patent to W. M. Leighton, 953,627, dated March 29, 1910. In that patent there was disclosed an engine cylinder, a piston reciprocating therein, and having grooves for the reception of piston rings, packing rings fitting within said grooves and fitting them rather loosely, each ring being provided in its outer cylindrical side with an annular channel facing toward the cylinder and formed with perforations through its body leading from the annular channel in the piston ring to the inner cylindrical surface of the ring.

The piston ring of my invention possesses the annular channel in its outer cylindrical side and in place of the small perforations that establish communication between this channel and the inner cylindrical surface of the ring I provide elongated slots in the zone of the annular channel. While these elongated slots serve to establish communication between the corresponding piston ring channel and the holes in the piston for the purpose of returning lubricant to the crank case of the engine, they reduce the trapping of the lubricant in the piston groove both at the outer and inner cylindrical sides of the corresponding piston ring whereby the resilience of the ring is unimpaired and the flow of the lubricant back to the crank case is made more gradual and uniform. With such elongated slots the distribution of the lubricant in the piston groove and around the solid parts of the piston that intervenes between the elongated slots therein is also more uniform with the result that the supply of lubricant to all portions of the piston ring and the walls of the groove receiving it is not unduly diminished in spots.

I will explain my invention more fully by reference to the accompanying drawing showing the preferred embodiment thereof and in which Fig. 1 is a sectional view illustrating a portion of an engine cylinder, a portion of a piston in the cylinder, and piston rings in the piston grooves that are formed in the piston; Fig. 2 is a sectional view on line 2—2 of Fig. 1; and Fig. 3 is a perspective view illustrating the preferred form of piston ring shown in Figs. 1 and 2.

Like parts are indicated by similar characters of reference throughout the different figures.

My invention is of particular service in connection with internal combustion hydrocarbon engines, though the invention is not to be thus restricted.

The engine cylinder 1 may be of any suitable type, the engine cylinder usually communicating at its inner end with the crank case containing a bath of lubricating oil from which working parts of the engine are supplied. The piston 2 is of any suitable or usual form, having one or more annular piston ring grooves 3, 4, 5 that receive piston rings 6, 7, 8. The piston ring groove 5 is nearest the crank case and this groove contains a piston ring of my invention, it being unnecessary to provide such a piston ring in the other piston ring grooves of the piston. The innermost piston ring 8 is formed with an annular channel 9 in a zone of the piston ring that is parallel to and midway between the inner and outer flat sides of the ring. Elongated slots 10 are formed in the piston ring and are disposed in the zone that contains the annular channel 9. These slots are preferably narrower than the channel 9 and diverge outwardly to promote the reception of lubricating oil into the slots and to establish full flow of the lubricant through the inner ends of the slots into the space between the piston ring and the cylindrical side of the groove 5 that is faced by the inner cylindrical surface of the ring.

Lubricating oil is scraped from the inner cylindrical surface of the cylinder and finds entry into the channel 9 at the places between the slots 10 and also where these slots are located. The lubricant will not only find passage in a peripheral direction from the portions of the channel 9 that are between the slots but will also find passage in a peripheral direction along the long sides of the slots and also crosswise of the channel 9 into said slots whereby the flow of lubricant from the channel 9 through the ring is made copious and uniform. The oil finding entry to the interior of the ring through the inner and narrower ends of the slots will work its way circumferentially of the zone of the ring to form suitable packing between the solid portions 11 of the ring and the piston. The holes 12 in the piston lead from the groove 5 into the interior of the piston and serve to convey lubricant back to the crank case. These holes are preferably restricted in relation to the slots 10 so that the return flow of lubricant to the crank case will not be too rapid, yet copious enough to maintain proper circulation of the lubricant.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In an engine, the combination with the cylinder thereof; of a hollow piston having a circumferential groove therein; and a packing ring within the groove, said packing ring being formed with an exterior annular channel in a zone between the flat faces of the ring, and elongated outwardly diverging slots in the zone of the channel and opening upon the inner cylindrical surface of the ring, the elongated slots establishing communication between said annular channel and the interior of the ring and being narrower than the channel, said piston having holes establishing communication between its interior and its aforesaid circumferential groove.

2. In an engine, the combination with the cylinder thereof; of a hollow piston having a circumferential groove therein; and a packing ring within the groove, said packing ring being formed with an exterior annular channel in a zone between the flat faces of the ring, and elongated slots in the zone of the channel and opening upon the inner cylindrical surface of the ring, the elongated slots establishing communication between said annular channel and the interior of the ring and being narrower than the channel, said piston having holes establishing communication between its interior and its aforesaid circumferential groove.

3. In an engine, the combination with the cylinder thereof; of a hollow piston having a circumferential groove therein; and a packing ring within the groove, said packing ring being formed with an exterior annular channel in a zone between the flat faces of the ring, and elongated slots in the zone of the channel and opening upon the inner cylindrical surface of the ring, the elongated slots establishing communication between said annular channel and the interior of the ring, said piston having holes establishing communication between its interior and its aforesaid circumferential groove.

4. In an engine, the combination with the cylinder thereof; of a hollow piston having a circumferential groove therein; and a packing ring within the groove, said packing ring being formed with an exterior annular channel in a zone between the flat faces of the ring, and elongated outwardly diverging slots in the zone of the channel and opening upon the inner cylindrical surface of the ring, the elongated slots establishing communication between said annular channel and the interior of the ring, said piston having holes establishing communication between its interior and its aforesaid circumferential groove.

In witness whereof, I hereunto subscribe my name this twentieth day of October, A. D. 1921.

CHARLES N. TEETOR.